United States Patent
Khatri et al.

(10) Patent No.: US 10,146,289 B2
(45) Date of Patent: *Dec. 4, 2018

(54) POWER SYSTEM UTILIZING PROCESSOR CORE PERFORMANCE STATE CONTROL

(71) Applicant: Dell Products L.P., Round Rock, TX (US)

(72) Inventors: Mukund P. Khatri, Austin, TX (US); Paul T. Artman, Austin, TX (US); Humayun Khalid, Austin, TX (US); Michael Karl Molloy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/282,497

(22) Filed: Sep. 30, 2016

(65) Prior Publication Data

US 2017/0017287 A1 Jan. 19, 2017

Related U.S. Application Data

(63) Continuation of application No. 13/645,946, filed on Oct. 5, 2012, now Pat. No. 9,524,012.

(51) Int. Cl.
*G06F 1/32* (2006.01)

(52) U.S. Cl.
CPC ............ *G06F 1/324* (2013.01); *G06F 1/3206* (2013.01); *G06F 1/3265* (2013.01); *G06F 1/3287* (2013.01); *G06F 1/3296* (2013.01); *Y02D 10/126* (2018.01); *Y02D 10/172* (2018.01)

(58) Field of Classification Search
None
See application file for complete search history.

(56) References Cited

U.S. PATENT DOCUMENTS

| | | | |
|---|---|---|---|
| 7,827,421 | B2 | 11/2010 | Brewer et al. |
| 2011/0078478 | A1 | 3/2011 | Branover et al. |
| 2013/0047166 | A1 | 2/2013 | Penzes et al. |
| 2014/0100706 | A1 | 4/2014 | Khatri et al. |
| 2014/0115596 | A1 | 4/2014 | Khan et al. |

OTHER PUBLICATIONS

Rangan, Krishna, "Thread Motion: Fine-grained Power Management for Multi-Core Systems", 2009 ACM.*

* cited by examiner

*Primary Examiner* — Carlos R Ortiz Rodriguez
(74) *Attorney, Agent, or Firm* — Haynes and Boone, LLP

(57) ABSTRACT

An information handling system includes a power supply coupled to a processor that includes a plurality of cores. A power system controller is coupled to the power supply and the processor. The power system controller may set each of the plurality of cores to a performance state that is below a highest performance state. The power system controller may then determine whether the power supplied from the power supply to the processor during operation is sufficient to operate each of the plurality of cores at the highest performance state. In response to the power being insufficient to operate each of the plurality of cores at the highest performance state, the power system controller may control the plurality of cores such that a subset operate at the highest performance state and the remainder operate at a performance state that is lower than the highest performance state.

20 Claims, 4 Drawing Sheets

POWER SYSTEM UTILIZING PROCESSOR CORE PERFORMANCE STATE CONTROL

CROSS-REFERENCE TO RELATED APPLICATIONS

This is a Continuation application to U.S. Utility application Ser. No. 13/645,946 filed Oct. 5, 2012, entitled "POWER SYSTEM UTILIZING PROCESSOR CORE PERFORMANCE STATE CONTROL," the disclosure of which is incorporated herein by reference in its entirety.

BACKGROUND

The present disclosure relates generally to information handling systems, and more particularly to a power system that utilizes processor core performance state control in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The power requirements of IHSs are steadily increasing. For example, as processors have added cores and other processing features, the sustainable power requirements, dynamic power requirements, and peak power requirements of the power system have increased. Traditionally, processor thermal design power (TDP) has been used for (indefinitely) sustainable power requirement budgeting purposes, and only a small amount of additional power was budgeted for dynamic power requirements and peak power requirements that are above the TDP of the processor. However, as the number of processor cores has increased (from 1, to 2, to 4, to 8, and to 10 and higher), the ability of all cores to simultaneously transition from an idle state to an active state has driven the dynamic power requirements and peak power requirements rapidly relative to the sustainable power requirements. For example, maximum or peak power ("$P_{max}$", typically sustainable on the order of milliseconds to tens of milliseconds) has grown from 1.3×TDP, to 1.6×TDP, and up to 2.2×TDP, and dynamic power ("$P_{dyn}$", typically sustainable on the order of hundreds of milliseconds to seconds) has grown from 1.0×TDP, to 1.2×TDP, to 1.6×TDP for some processors in the last 5 years. Processor cores and other computing elements can activate on the order of nanoseconds, which is orders of magnitude faster than conventional monitoring and throttling mechanisms can respond.

Worst case theoretical dynamic power requirements and peak power requirements are typically determined to describe all possible processor usage models, including those that are very unlikely or that may only be realized by a small subset of users and applications. For example, worst case theoretical requirements may consider a small subset of the processor instruction set that is only used in specific high performance computing (HPC) workloads, "thermal virus" level code segments that require micro-architectural knowledge to generate, worst case processor operating parameters (e.g., worst case voltage, temperature, process, etc.), 100% processor/system utilization (typical utilization is between 30-70%), and/or a variety of other worst case scenarios known in the art. As these worst case theoretical dynamic power requirements and peak power requirements have grown, the difference between the actual or measured dynamic power requirements and peak power requirements and those worst case theoretical requirements has grown as well.

Furthermore, denser systems are requiring more and more from the power system. Conventional servers today have 2 to 4 processors, with newer designs having 4 to 8 processors and some emerging architectures having dozens of processors. Other computing elements such as memory, graphics controllers, co-processors, network controllers, drives, etc. are also dramatically increasing their dynamic and peak power requirements compared to their "TDP" or sustainable power requirements. These other computing elements may have dynamic and peak power requirements that have substantially different durations and duty cycles than those required by processors.

As the number of processors and other high-power devices in the system grows, it becomes less and less feasible to budget the power system based on theoretical dynamic power requirements and peak power requirements, as those theoretical requirements drive excessive power systems that are costly, inefficient, and difficult (if not impossible) to implement.

Accordingly, it would be desirable to provide an improved power system.

SUMMARY

According to one embodiment, an information handling system includes a power supply; a processor coupled to the power supply and including a plurality of cores; a memory coupled to the processor; and a power system controller coupled to the power supply and the processor, wherein the power system controller is operable to: set each of the plurality of cores in the processor to a performance state that is below a highest performance state; determine whether the power supplied from the power supply to the processor during operation of the processor is sufficient to operate each of the plurality of cores at the highest performance state; and in response to the power supplied to the processor being insufficient to operate each of the plurality of cores at the highest performance state, control the plurality of cores such that a subset of the plurality of cores operate at the highest performance state and the remainder of the plurality of cores operate at a performance state that is lower than the highest performance state.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
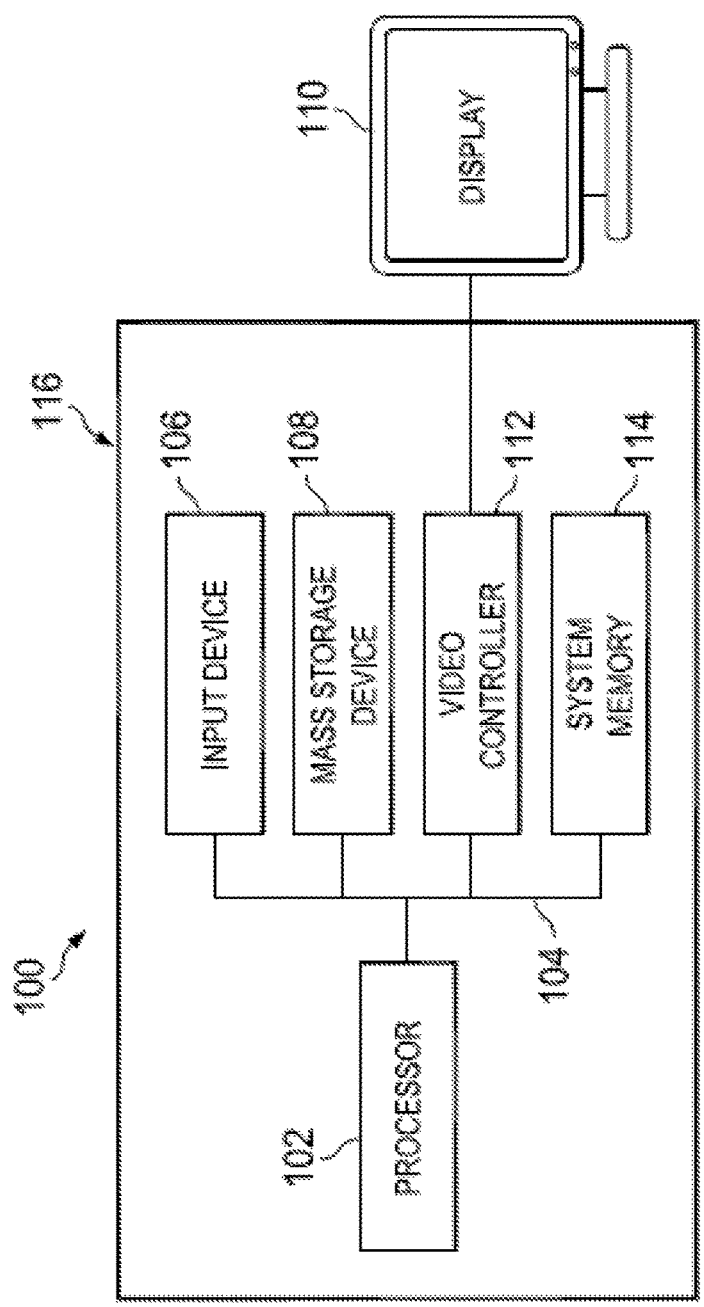
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
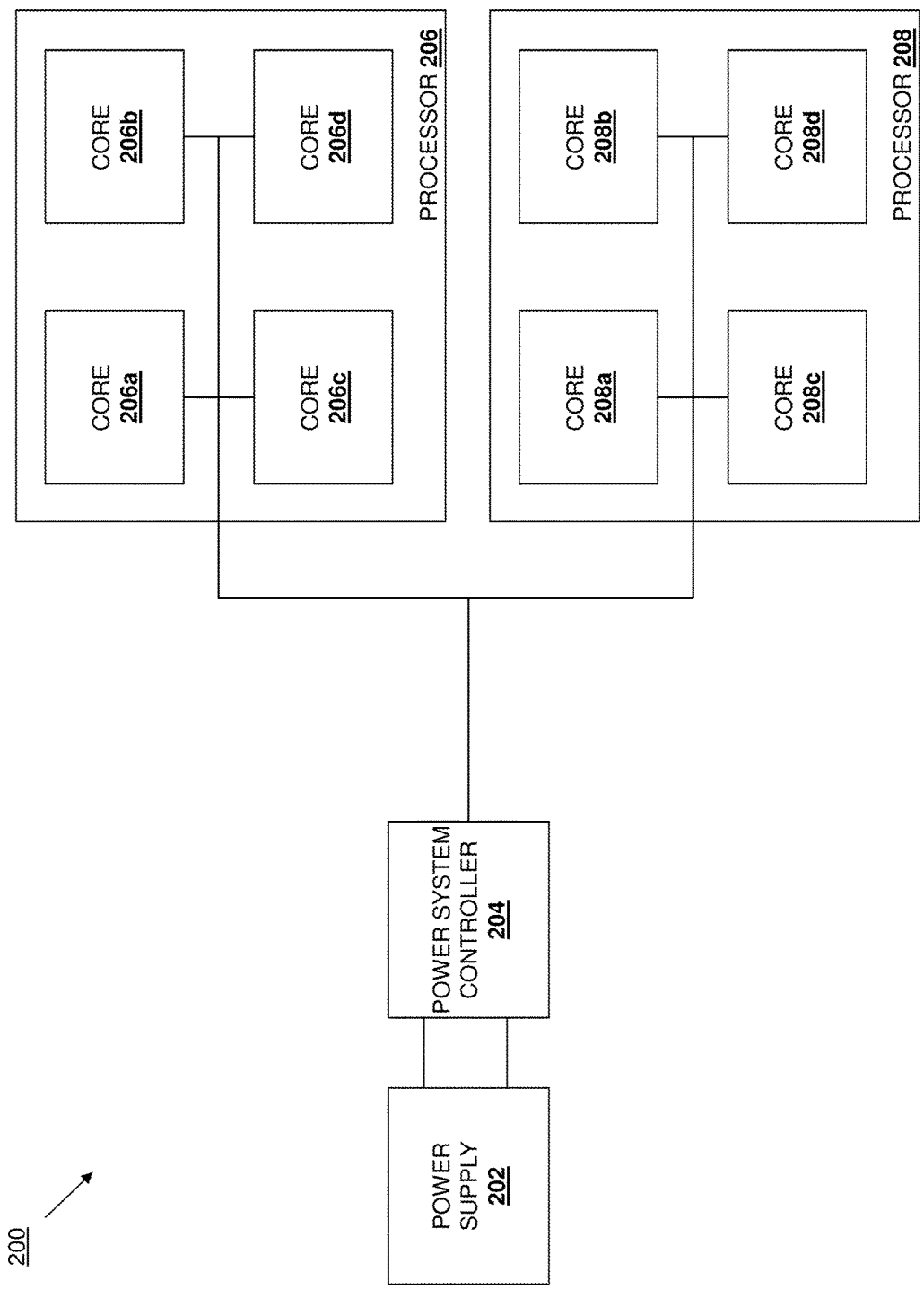
FIG. 2 is a schematic view illustrating an embodiment of a power system.

Referring now to FIG. 2, an embodiment of a power system 200 is illustrated. As discussed in further detail below, the power system 200 may be implemented in or with a variety of IHS's known in the art. For example, the power system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the power system 200 may be implemented with a modular IHS such as, for example, a blade server. As such, in some embodiments, all of the elements in the power system 200 may be housed in an IHS chassis (e.g., the chassis 116 discussed above with reference to FIG. 1), while in other embodiments, elements of the power system 200 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The power system 200 includes a power supply 202 that may include one or more power supply units (PSUs), one or more power distribution units (PDUs), and/or a variety of other power supply components known in the art. In the illustrated embodiment, a power system controller 204 is coupled to the power supply 202, to a processor 206 having cores 206a, 206b, 206c, and 206c, and to a processor 206 having cores 206a, 206b, 206c, and 206c. In an embodiment, the processors 206 and 208 are coupled to the power supply 202 and the power system controller 204 through respective processor sockets (not illustrated). In other embodiments, the power system controller 204 may be coupled to a variety of powered systems having subsystems that operate similarly to the processors and their cores discussed below. For example, the power system controller 204 may be coupled to any of the IHS components of the IHS 100 discussed above with reference to FIG. 1, including memory systems, mass storage systems, video systems, input systems, and/or a variety of other powered systems known in the art. Furthermore, processors may include fewer cores than the number cores illustrated (e.g., 2 cores) or more cores than the number of cores illustrated (e.g., 8 cores, 12 cores, or more) while remaining within the scope of the present disclosure. While the examples below focus on the cores 206a-d in the processor 206, the teachings of the present disclosure may be applied to the cores 208a-d in the processor 208, to any number of cores in one or more processors, and/or to any subsystems in a powered system that include multiple performance states.

In an embodiment, the power system controller 204 may be provided by a Basic Input/Output System (BIOS), an active power controller such as a Dell Active Power Controller (DAPC) available from Dell Computers, Inc., an Operating System (OS) power management system, combinations thereof, and/or a variety of other power system controllers known in the art. In one example, the power system controller 204 may include an active power controller that is provided by instructions that are part of a BIOS in an IHS, and those instructions may provide for the monitoring of the utilization of cores in one or more processors along with the determination of performance states for those cores based on the processing needs of the IHS, as explained in further detail below. However, one of skill in the art will recognize that the power system controller 204 discussed herein may be provided in a variety of manners while remaining within the scope of the present disclosure.

Figure 3:
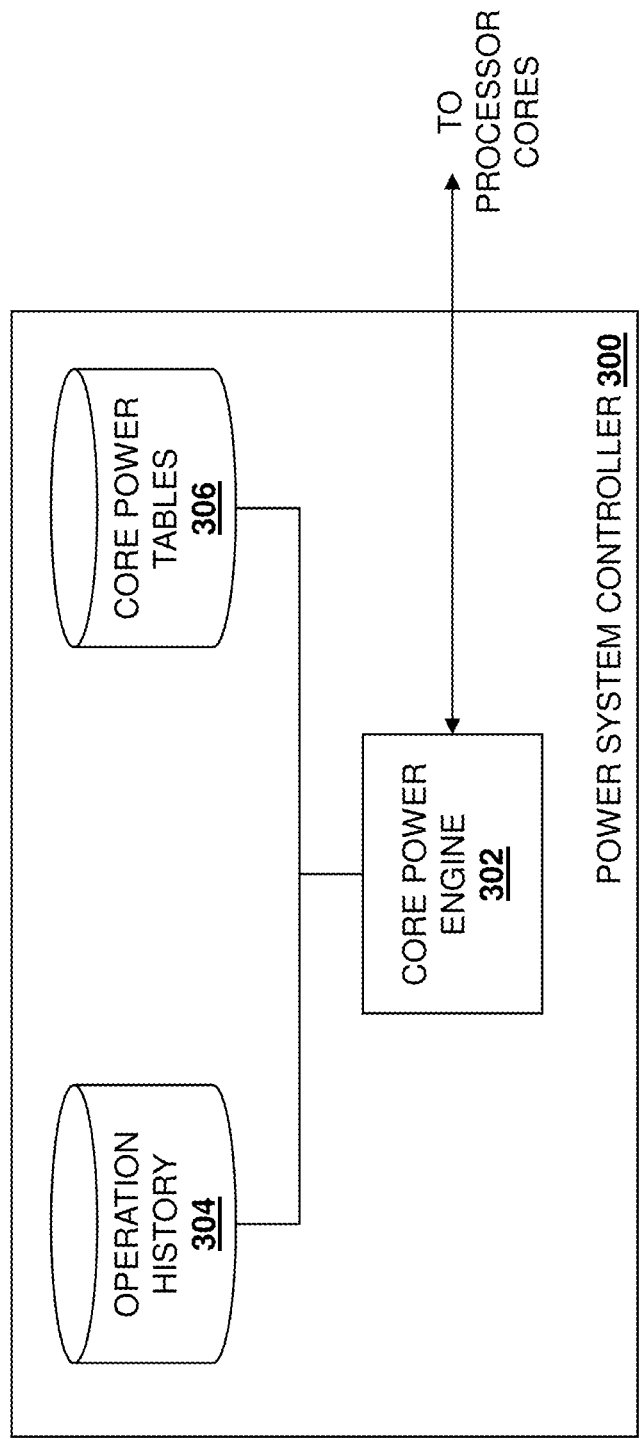
FIG. 3 is a schematic view illustrating an embodiment of a power system controller.

Referring now to FIG. 3, an embodiment of a power system controller 300 is illustrated that may be, for example, the power system controller 204 discussed above with reference to FIG. 2. The power system controller 300 includes a core power engine 302 that is coupled to the cores of the processors and to each of an operation history 304 and core power tables 306. In an embodiment the core power engine 302 may include instructions that are stored on a non-transitory, computer-readable medium that, when executed by a processor, cause the processor to perform the functions of the power system controller 204/300 discussed below. The operation history 304 and core power tables 306 may include operation data that is used to implement heuristics to determine the optimized set of cores that should be operating in their highest performance state during any given time window so as to maximize performance per watt in a given system configuration.

In an embodiment, the operation history 304 and core power tables may include databases that may store operation histories and operation tables for the cores 206a-d and 208a-d of the processors 206 and 208, respectively. For example, the operation history 304 may include operation data received from hardware performance counters that track the cache miss rate and branch prediction miss rates miss rates of each of the cores 206a-d and 208a-d, and that operation data may be used in the core power tables 306 to prioritize subsets of the cores relative to the non-prioritized cores. For example, cores with higher cycles per instruction (CPI) due to higher branch mis-predictions rates should be prioritized over other cores. This is because these cores require higher CPU horsepower and thus higher frequencies for high performance state operation. Thus dropping power state for such cores would be detrimental to system performance. On the other hand, cores with higher CPI due to higher cache miss rates should be operated at lower power levels and thus lower frequencies because these core need to go to the memory for data, which is several times slower than the CPU. Therefore, in latter cases, the lowering of state/frequency of CPU will not significantly impact system level performance.

In an embodiment, each of the cores in a processor may be coupled to a different voltage plane that is coupled to the power system controller 204 and the power supply 202. In the embodiment discussed below, the cores 206a-d in the processor 206 may each be separately operable in a plurality of performance states by, for example, providing a predetermined voltage on the voltage plane that is coupled to each core. For example, each of the cores 206a-d in the processor 206 may be operable in a plurality of performance states P0 . . . Pn, with the cores operable at a maximum frequency that can consume a maximum power when operating at performance state P0, at a scaled voltage and frequency that is less than those at P0 when operating at performance state P1, at a scaled voltage and frequency that is less than those at P1 when operating at performance state P2, and generally at scaled voltages and frequencies that are less than those at P(n−1) when operating at performance state Pn.

Furthermore, in some embodiments, particular performance features may be available during core operation when the cores are operating at particular performance states, and those particular performance features may not be available during core operation when the cores are operating at other performance states. For example, the cores 206a-d in the processor 206 may have a "turbo" mode available when the cores 206a-d are operating in performance state P0, but that "turbo" mode may not be available with the cores 206a-d are operating in a performance state that is lower than P0. While a particular transient high power demand performance feature, "turbo" mode, has been provided herein as a performance feature only available at the highest performance state, there may be a variety of different performance features available during core operation that are available at one or more performance states but not available at other performance states.

In conventional systems, when a workload being run by an IHS requires that a core in a processor operate at a particular performance state (e.g., a P0 performance state), the entire processor socket is provided a voltage (e.g., through a single voltage plane coupled to the processor socket) to enable that performance state of the core. By providing that voltage to the entire processor socket, each of the cores in the processor is operated at that same performance state. When the performance state is a high performance state (e.g., processor performance state P0), the power demand produced on the power supply 202 can be relatively high, and transient high power demand features such as, for example, "turbo" mode, may produce a power demand that exceeds the power output capabilities of the power supply 202. However, the power system 200 of the present disclosure takes advantage of the fact that, when operating according to a vast majority of workload scenarios, only a subset of the cores in a processor in an IHS will be fully utilized at any particular instance. As such, the systems and methods of the present disclosure manage the performance states of each of the cores in a processor based on the system configuration workload requirements such that only the cores that are needed at full utilization are operated at their highest performance state, while other cores that are not fully utilized by the workload are operated at a performance state below their highest performance state.

Figure 4:
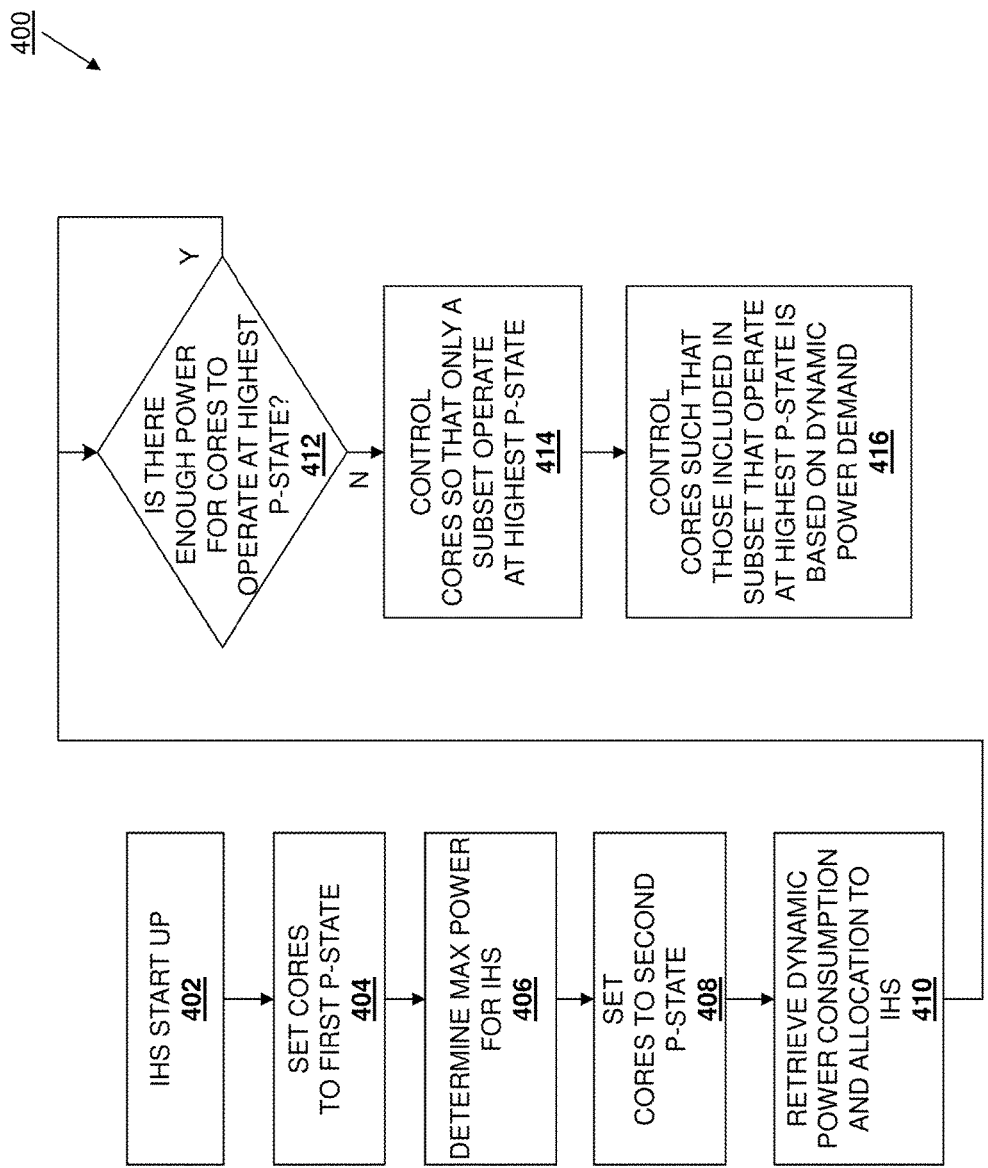
FIG. 4 is a flow chart illustrating an embodiment of a method for power supply output capability processor control in an information handling system.

Referring now to FIG. 4, an embodiment of a method 400 for power supply output capability processor core control is illustrated. The method 400 begins at block 402 where an IHS is started up. In an embodiment, an IHS that is coupled to or included in the power system 200, discussed above with reference to FIG. 2, may be powered-on, resumed, awaken, or otherwise started up from an off-state, sleep state, or other low power state. The method 400 then proceeds to block 404 where the cores in the processors are set to a first performance state. In an embodiment, at block 404, the power system controller 204 may start each of the cores 206a-d in the processor 206 in a first performance state that may include the lowest performance state of the cores, a low enough performance state to ensure that the operation of the cores does not exceed the power supply output capability of the power supply 202, and/or a performance state that is below the highest performance state of the cores. In one example, in response to start-up of the IHS, the BIOS starts each of the cores 206a-d in the processor 206 in their lowest performance state by controlling the voltage supplied to the respective voltage planes coupled to each of those cores to ensure that the power demand from the IHS on the power supply 202 is within a power supply output capability of the power supply 202.

The method 400 then proceeds to block 406 where a maximum power range for the IHS is determined. In an embodiment, the power system controller 204 is operable to retrieve an IHS configuration and/or platform inventory to determine a power supply power budget for supplying power from the power supply 202 to the IHS or its components. For example, at block 406, the BIOS may operate in cooperation with a service processor and/or other associated firmware to retrieve the IHS configuration and/or platform inventory and use that IHS configuration/platform inventory to determine a power supply power budget that allocates power from the power supply 202 for each processor socket and its associated processor (e.g., the processors 206 and 208), for other subsystems in the IHS, and/or for the entire IHS to operate within. In an embodiment, the power supply power budget may be based on the workloads expected to be run using the IHS.

The method 400 then proceeds to block 408 where the cores are set to a second performance state. In an embodiment, the power system controller 204 is operable to transition each of the cores 206*a-d* in the processor 206 to a second performance state that is below the highest performance state of the cores. In one example, following block 406, the BIOS sets each of the cores 206*a-d* in the processor 206 to the second performance state by controlling the voltage supplied to the voltage planes coupled to those cores such that each of the cores are set to performance state P1 or other performance state lower than P0. As discussed above, setting each of the cores to the performance state lower than P0 may ensure that those cores are unable to operate in a "turbo" mode or perform other P0 performance state features associated with transient dynamic or peak power excursions by the cores in the processor. In an embodiment, at a point between blocks 402 and 408, an active power controller or OS power management system may be enabled, and may operate in cooperation with the BIOS to provide the power system controller 204 that starts each of the cores at a performance state that is lower than their highest performance state.

The method 400 then proceeds to block 410 where the dynamic power consumption of and/or power allocation to the subsystems is retrieved. In an embodiment, the power system controller 204 may monitor and/or retrieve the dynamic power consumption of and power allocation to subsystems in the powered system. For example, at block 410, the active power controller or OS power management system may retrieve the power consumption of and/or power allocation to each processor socket and its associated processor. In an embodiment, block 410 may be continuously performed during blocks 412, 414, and 416 of the method 400 to continually monitor the dynamic power consumption of and/or power allocation to the IHS and/or its IHS components.

The method 400 then proceeds to decision block 412 where it is determined whether there is enough power for the cores in a processor to operate at their highest performance state. In an embodiment, the power system controller 204 is operable to compare the power supply power budget to the maximum power demand from the IHS. For example, at decision block 412, the active power controller or OS power management system may compare the power supply power budget to a power demand that may result if each of the cores in a processor are operated at their highest performance state (e.g., performance state P0 that enables a "turbo" mode or other transient dynamic and peak power excursion features). If, at decision block 412, it is determined that the power supply power budget provides enough power for each of the cores 206*a-d* in the processor 206 to operate at their highest performance state, each of the cores in the processors may be provided a voltage (e.g., through their respective voltage planes) that enables their highest performance state and/or each of the cores in the processors may be otherwise enabled to operate at their highest performance state, and the method 100 will loop through decision block 412 to continue to determine whether there is enough power for the cores in the processor to operate at their highest performance state.

If, at decision block 412, it is determined that there is not sufficient power to operate the cores in a processor at their highest performance states, the method 100 proceeds to block 414 where the cores in the processor are controlled so that only a subset operate at their highest performance state. In an embodiment, at decision block 412, the active power controller or OS power management system may determine that the power supply power budget is insufficient for each of the cores 206*a-d* in the processor 206 to run at their highest performance states and, in response, control the voltage provided to each of the cores (through their respective voltage planes) to separately control each of the cores 206*a-d* in the processor 206 such that only a subset operate at their highest performance state. Thus, the active power controller or OS power management engine may manage the performance states of the cores 206*a-d* in the processor 206 on a per-core basis such that subsets of the cores 206*a-d* in the processor 206 may be operate at their highest performance state with the remaining operating at a performance state that is lower than their highest performance state in order to ensure that dynamic and/or peak power excursions by the cores 206*a-d* in the processor 206 cannot occur at the same time. For example, a subset of the cores 206*a-d* and/or 208*a-d* in the processors 206 and/or 208, respectively, may be set to performance state P0, while the remainder of the cores in those processor may be set to performance states P1, P2, and/or lower performance states.

The method 400 then proceeds to block 416 where the cores in the processors are controlled such that those included in the subset that are at their highest performance state is based on the dynamic power demands of the cores. In an embodiment, the power system controller 204 is operable to monitor the dynamic utilization of each core 206*a-d* in the processor 206 and thus determine the dynamic power demand from those cores. Using the dynamic core utilization and power demands of the cores 206*a-d*, the power system controller 204 can swap different cores in the processors 206 in and out of the subset of cores that are operating at their highest performance state in order to enable those cores to perform according to system requirements and associated workloads, thus limiting the number of cores operating at their highest performance state and/or that are operable to create transient dynamic and/or peak power excursions that could exceed the power supply power budget. In other words, the power system 200 ensures that cores operate in their highest performance mode when they are needed to (e.g., by a workload) while also ensuring that the overall power supply power budget for the system is adhered to.

In an embodiment, the power system controller 204 (e.g., a BIOS, an active power controller, OS power management system, combinations thereof, and/or other power system controller components) may implement heuristics to determine the optimized subset of cores in a processor that will be allowed to enter their highest performance state during any particular time window so as to maximize the performance per watt of the power system 200. In an embodiment, using the operation data in the operation history 304 and core power tables 306, the core power engine 302 may prioritize cores relative to each other with regard to their operation at particular performance states. For example, subsets of cores with higher cycles per instruction (CPI) due to higher branch mis-predictions rates should be prioritized over other cores and put in higher performance state. Cores with higher CPI due to higher cache miss rates should be operated at lower power levels and thus lower frequencies because these core need to go to the memory for data, which is several times slower than the CPU. Furthermore, the core power engine 302 may be operable to detect changes in the configuration of an IHS (e.g., removal of a drive, etc.) that allow the power system controller 204/300 to factor in or other allocate more power to the processors 206 and 208 and, in response, add cores to the subset of cores that are operated at their highest performance state (e.g., because there is additional power available to do so.)

Thus, a system and method have been described that allow a power supply to be sized for the average loads and/or power demands of an IHS by providing per-core performance state management of cores in a processor, which allows a power supply power budget to provide sufficient power to the system for dynamic and peak power excursions by limiting the number of cores in the processor that may operate in their highest performance state and perform those dynamic and peak power excursions. Because only a subset of cores in a processor are needed at full utilization during any given time window, the monitoring of dynamic core utilization and power demand of the cores, along with the management of performance states of the cores on a per core basis, prevents the cores from operating such that dynamic or peak power excursions by those cores will exceed the power supply output capability of the power supply such that a shutdown of the power supply occurs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power system, comprising
  a powered system including a plurality of subsystems that are each configured to operate in a plurality of different frequencies that each provide a respective performance state;
  a power system controller that is coupled to each of the plurality of subsystems in the powered system through a respective dedicated power connection, and that is configured to couple to a power supply, wherein the power system controller is configured to:
    control power provided from the power supply to the respective dedicated power connection for each of the plurality of subsystems in the powered system such that each of the plurality of subsystems operate at a respective performance state;
    identify at least one workload that is to be performed using at least some of the plurality of subsystems and that is associated with a workload-based power budget; and
    control, in response to identifying the at least one workload, power provided from the power supply to the respective dedicated power connection for each of the plurality of subsystems such that a subset of the plurality of subsystems operate at a highest frequency that provides the highest performance state and the remainder of the plurality of subsystems operate at least one frequency that provides a performance state that is lower than the highest performance state using the workload-based power budget such that the plurality of subsystems perform the at least one workload according to the workload-based power budget.

2. The power system of claim 1, wherein the controlling power provided from the power supply to the respective dedicated power connection for each of the plurality of subsystems such that the subset of the plurality of subsystems operate at the highest frequency that provides the highest performance state and the remainder of the plurality of subsystems operate at the at least one frequency that provides the performance state that is lower than the highest performance state ensures that only a predetermined number of the subsystems are capable of demanding a subsystem peak power amount.

3. The power system of claim 1, wherein the power system controller is further configured to:
  retrieve a powered system configuration; and
  determine a power-supply-based power budget for the powered system using the powered system configuration, wherein the at least one frequency that provides the performance state that is lower than the highest performance state is selected using the power-supply-based power budget such that the powered system does not demand power that exceeds the power-supply-based power budget.

4. The power system of claim 1, wherein the power system controller is further configured to:
  monitor a dynamic power demand of the powered system; and
  control power provided from the power supply to the respective dedicated power connection for each of the plurality of subsystems such that the plurality of subsystems included in the subset of the plurality of subsystems that operate at the highest frequency that provides the highest performance state changes.

5. The power system of claim 1, wherein the power system controller is coupled to at least one database that includes operation data for the plurality of subsystems in the powered system.

6. The power system of claim 5, wherein the power system controller is further configured to:
  retrieve the operation data for the plurality of subsystems from the at least one database; and
  use the operation data along with the workload-based power budget to control power provided from the power supply to the respective dedicated power connection for each of the plurality of subsystems such that the subset of the plurality of subsystems operate at the highest frequency that provides the highest performance state and the remainder of the plurality of subsystems operate at the at least one frequency that provide the performance state that is lower than the highest performance state.

7. The power system of claim 1, wherein the highest performance state makes a transient high power demand performance feature available in the plurality of subsystems, and wherein the performance state that is lower than the highest performance state makes the transient high power demand performance feature unavailable in the plurality of subsystems.

8. An information handling system (IHS), comprising:
  a power supply;
  a processor coupled to the power supply and including a plurality of cores;
  a memory coupled to the processor; and
  a power system controller that is coupled to the power supply and to each of the plurality of cores in the processor through a respective voltage plane, wherein the power system controller is configured to:
    control power provided from the power supply to the respective voltage plane for each of the plurality of cores in the processor such that each of the plurality of cores operate at a respective performance state;
    identify at least one workload that is to be performed using at least some of the plurality of cores and that is associated with a workload-based power budget; and
    control, in response to identifying the at least one workload, power provided from the power supply to the respective voltage plane for each of the plurality of cores such that a subset of the plurality of cores operate at the highest performance state and the remainder of the plurality of cores operate at a performance state that is lower than the highest performance state such that the plurality of scores perform the at least one workload according to the workload-based power budget.

9. The IHS of claim 8, wherein the controlling power provided from the power supply to the respective voltage plane for each of the plurality of cores such that the subset of the plurality of cores operate at the highest performance state and the remainder of the plurality of cores operate at the performance state that is lower than the highest performance state ensures that only a predetermined number of the cores are capable of demanding a core peak power amount.

10. The IHS of claim 8, wherein the power system controller is further configured to:
retrieve an IHS configuration; and
determine a power-supply-based power budget for the processor using the IHS configuration, wherein the performance state that each of the plurality of cores operate at and that is below the highest performance state is selected using the power-supply-based power budget such that the processor does not demand power that exceeds the power-supply-based power budget.

11. The IHS of claim 8, wherein the power system controller is further configured to:
monitor a dynamic power demand of the processor; and
control power provided from the power supply to the respective voltage plane for each of the plurality of cores such that the plurality of cores included in the subset of the plurality of cores that operate at the highest performance state changes.

12. The IHS of claim 8, wherein the power system controller is coupled to at least one database that includes operation data for the plurality of cores in the processor.

13. The IHS of claim 12, wherein the power system controller is further configured to:
retrieve the operation data for the plurality of cores from the at least one database; and
use the operation data along with the workload-based power budget to control power provided from the power supply to the respective voltage plane for each of the plurality of cores such that the subset of the plurality of cores operate at the highest performance state and the remainder of the plurality of cores operate at the performance state that is lower than the highest performance state.

14. The IHS of claim 8, wherein the highest performance state makes a transient high power demand performance feature available in the plurality of cores, and wherein the performance state that is lower than the highest performance state makes the transient high power demand performance feature unavailable in the plurality of cores.

15. A method for power supply output capability processor control in an information handling system (IHS), comprising:
controlling power provided from a power supply to a respective voltage plane coupled to each of a plurality of cores in a processor such that each of the plurality of cores operate at a respective performance state;
identifying at least one workload that is to be performed using at least some of the plurality of cores and that is associated with a workload-based power budget; and
controlling, in response to identifying the at least one workload, power provided from the power supply to the respective voltage plane coupled to each of the plurality of cores such that a subset of the plurality of cores operate at the highest performance state and the remainder of the plurality of cores operate at a performance state that is lower than the highest performance state such that the plurality of cores perform the at least one workload according to the workload-based power budget.

16. The method of claim 15, wherein the controlling power provided from the power supply to the respective voltage plane coupled to each of the plurality of cores such that the subset of the plurality of cores operate at the highest performance state and the remainder of the plurality of cores operate at the performance state that is lower than the highest performance state ensures that only a predetermined number of the cores are capable of demanding a cores peak power amount.

17. The method of claim 15, further comprising:
retrieving an IHS configuration; and
determining a power-supply-based power budget for the processor using the IHS configuration, wherein the performance state that each of the plurality of cores operate at and that is below the highest performance state is selected using the power-supply-based power budget such that the processor does not demand power that exceeds the power-supply-based power budget.

18. The method of claim 15, further comprising:
monitoring a dynamic power demand of the processor; and
controlling power provided from the power supply to the respective voltage plane coupled to each of the plurality of cores such that the plurality of cores included in the subset of the plurality of cores that operate at the highest performance state changes.

19. The method of claim 15, wherein at least one database includes operation data for the plurality of cores in the processor, and wherein the method further comprises:
retrieving the operation data for the plurality of cores from the at least one database; and
using the operation data along with the workload-based power budget to control power provided from the power supply to the respective voltage plane coupled to each of the plurality of cores such that the subset of the plurality of cores operate at the highest performance state and the remainder of the plurality of cores operate at the performance state that is lower than the highest performance state.

20. The method of claim 15, wherein the highest performance state makes a transient high power demand performance feature available in the plurality of cores, and wherein the performance state that is lower than the highest performance state makes the transient high power demand performance feature unavailable in the plurality of cores.

* * * * *